R. D. BRADFORD.
MIXING VALVE.
APPLICATION FILED DEC. 30, 1914.
1,303,762.
Patented May 13, 1919.
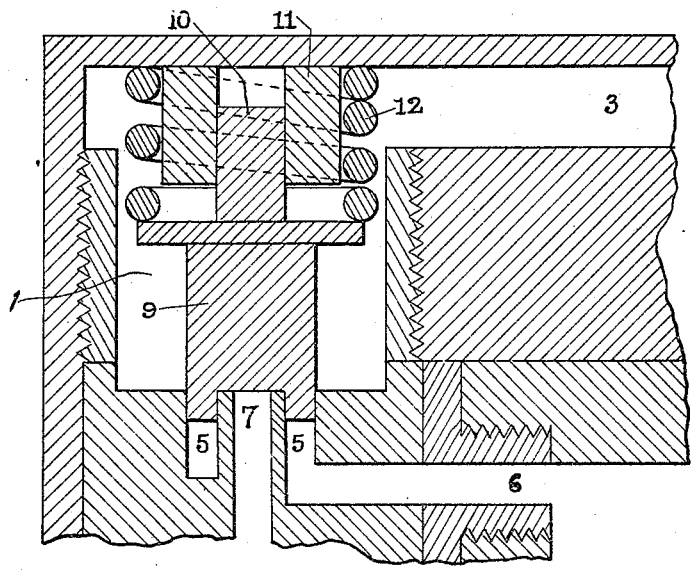

UNITED STATES PATENT OFFICE.

ROBERT DANIEL BRADFORD, OF LONDON, ENGLAND.

MIXING-VALVE.

1,303,762. Specification of Letters Patent. Patented May 13, 1919.

Application filed December 30, 1914. Serial No. 879,795.

*To all whom it may concern:*

Be it known that I, ROBERT DANIEL BRADFORD, a subject of the King of Great Britain and Ireland, residing at 43 Lissenden Mansions, Highgate Road, London, England, have invented a new or Improved Mixing-Valve, of which the following is a specification.

The invention relates to a new or improved valve for mixing fluids under pressure, for example, air and a liquid fuel, or air and a gaseous fuel and the valve is of that kind in which two concentric passages are opened and closed by a single valve adapted to move axially relatively to the passages.

According to this invention the valve proper is rotatable and constructed with a guiding means and with a portion adapted to enter the outer of the openings controlled by the valve and so to close both openings that the pressure of fluid in one of the passages may reduce the impact-force of the valve on its seat when closing.

In one method of mixing fluids in a valve according to this invention, when the pressure of the fluid within the inner fluid passage opening to the valve seat is sufficiently high the valve is forced from its seat against the pressure of the fluid acting within the closed valve chamber to keep the valve closed, and the separate fluids in rushing, each to the outlet for the mixture by way of the outer, or mixing passage, are violently agitated and thus effectively mixed in the said mixing passage before they reach the said outlet.

In order that the invention may be fully understood the following is a description of an embodiment thereof, reference being had to the accompanying drawing which represents a sectional view of the said embodiment.

The valve-proper 9 is furnished with an annular cylindrical end adapted to close and slide within the mixing passage 5. Into this passage it is guided by a cylindrical axial stem 10, which does not prevent its rotation to equalize wear and which is adapted to slide axially in a guide 11 carried by the valve chamber 1.

The said valve 9 is furnished with a shoulder between which and the upper wall of the valve chamber 1 a spring 12 is interposed to force the valve to its seat.

Supposing the fluid forced up the passage 7 to be a liquid, and the fluid under pressure arriving by the inlet passage 3 and occupying the valve chamber 1, to be air. The pressure of the liquid is such that the valve 9 is raised until it leaves its seat and opens the mixing passage 5. Then the diverging stream of liquid and the converging stream of air are forced into the said mixing chamber 5 where they commingle and from which they issue as a mixture along the outlet passage 6.

To prevent the valve 9 closing violently by reason of the pressure at its back when the pressure of the liquid in the passage 7 is reduced; for example, when the pressure is produced by a reciprocating pump-plunger, and to avoid undue noise and wear of the valve-face and valve-seat, the lower end of the valve 9 is recessed so that the projecting annular part thereof fits within the passage 5 to arrest the flow of the fluids and allow the liquid to exert its full remaining pressure, as a cushion, against the upper wall of the recess and thus to prevent the sudden closing of the valve.

If required, other means, such, for example, as a spring may be used to prevent the violent closing of the valve.

I may employ a check-valve between the mixing passage 5 and the delivery end of the outlet 6 when required.

Claims:

1. A mixing valve comprising in combination a valve seat, a central opening therein, a mixing passage opening surrounding said valve seat and said central opening, an inlet duct terminating in said central opening, an outlet duct from said mixing passage, a rotatable axially movable valve having a recessed seat and an annular cylindrical part surrounding said seat and adapted to enter and close the mixing passage opening until slid axially out therefrom and to be opened directly by the pressure of fluid in said inlet duct, means for guiding the said valve axially and a chamber inclosing said valve and having a duct opening thereinto for communicating with an exterior supply of fluid under pressure, substantially as described.

2. A mixing valve comprising in combination a valve seat, a central opening therein, a mixing passage opening surrounding said valve seat and said central opening, an inlet duct terminating in said opening, an outlet duct from said mixing passage, a rotatable axially movable valve having a recessed seat and an annular cylindrical part surrounding said seat and adapted to enter and close the mixing passage opening until slid axially out therefrom and to be opened directly by the pressure of fluid in said inlet duct an axial rod on said valve adapted to work in a relatively fixed guide, a spring adapted to force the said valve to its seat and a chamber inclosing said valve and having a duct opening thereinto for communicating with an exterior supply of fluid under pressure, substantially as described.

In testimony whereof I affix my signature in presence of two witnesses.

ROBERT DANIEL BRADFORD.

Witnesses:
W. WILSON HORN,
O. J. WORTH.

Copies of this patent may be obtained for five cents each, by addressing the "Commissioner of Patents, Washington, D. C."